(12) United States Patent
Jones

(10) Patent No.: US 9,350,778 B2
(45) Date of Patent: May 24, 2016

(54) MANAGEMENT AND PRIORITIZATION OF MEDIA ITEM DOWNLOADING

(71) Applicant: Apple Inc., Cupertino, CA (US)

(72) Inventor: Anne Jones, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 13/932,997

(22) Filed: Jul. 1, 2013

(65) Prior Publication Data

US 2013/0290413 A1    Oct. 31, 2013

Related U.S. Application Data

(60) Continuation of application No. 13/048,621, filed on Mar. 15, 2011, now Pat. No. 8,484,369, which is a division of application No. 12/723,616, filed on Mar. 12, 2010, now Pat. No. 7,941,555, which is a continuation of application No. 11/519,980, filed on Sep. 11, 2006, now Pat. No. 7,707,273.

(51) Int. Cl.
| | |
|---|---|
| *G06F 15/16* | (2006.01) |
| *H04L 29/06* | (2006.01) |
| *H04L 29/08* | (2006.01) |
| *G06F 17/30* | (2006.01) |
| *G06Q 30/06* | (2012.01) |
| *G06F 12/00* | (2006.01) |

(52) U.S. Cl.
CPC .......... *H04L 65/60* (2013.01); *G06F 17/30058* (2013.01); *G06Q 30/0601* (2013.01); *H04L 29/08072* (2013.01); *H04L 67/06* (2013.01); *H04L 67/322* (2013.01)

(58) Field of Classification Search
USPC .................. 709/203, 217–219, 223–229, 250, 709/231–232
See application file for complete search history.

(56) References Cited

U.S. PATENT DOCUMENTS

| | | | |
|---|---|---|---|
| 5,734,413 A | 3/1998 | Lappington et al. | |
| 6,470,496 B1 | 10/2002 | Kato et al. | |
| 6,731,312 B2 | 5/2004 | Robbin | |
| 7,707,273 B2 * | 4/2010 | Jones ................ | G06F 17/30058 709/219 |
| 7,941,555 B2 * | 5/2011 | Jones ................ | G06F 17/30058 709/231 |
| 8,484,369 B2 * | 7/2013 | Jones ................ | G06F 17/30058 709/231 |
| 2001/0039659 A1 | 11/2001 | Simmons et al. | |

(Continued)

OTHER PUBLICATIONS

McElhearn, Kirk, "The Complete Guide to iTunes' Podcasts", iLounge Article, http://www.ilounge.com/index.php/articles/comments/the-complete, XP-002483918, Jun. 28, 2005, 10 pages.

(Continued)

*Primary Examiner* — Zarni Maung
(74) *Attorney, Agent, or Firm* — Polsinelli LLP

(57) ABSTRACT

The disclosed embodiments relate generally to the downloading of media items. The media items may include, for example, audio, video, image, or podcast data. In accordance with one embodiment, two or more media items may be concurrently downloaded. In accordance with another embodiment, a user may control the downloading of each of the media items, as desired. More particularly, the user may choose to download, pause, or resume downloading one or more media items identified in the list of media items. In other words, the user may alter the download status of any of the items in the list of media items. In addition, the user may re-prioritize the order in which the media items in the list or a subset thereof are to be downloaded.

21 Claims, 7 Drawing Sheets

(56) References Cited

U.S. PATENT DOCUMENTS

| | | |
|---|---|---|
| 2002/0162099 A1 | 10/2002 | Lee et al. |
| 2005/0132083 A1 | 6/2005 | Raciborski et al. |
| 2005/0197906 A1 | 9/2005 | Kindig et al. |
| 2006/0100978 A1 | 5/2006 | Heller et al. |
| 2006/0156236 A1 | 7/2006 | Heller et al. |
| 2006/0156343 A1 | 7/2006 | Jordan |
| 2006/0167982 A1 | 7/2006 | Jawa et al. |
| 2006/0195507 A1 | 8/2006 | Baek et al. |
| 2006/0265503 A1 | 11/2006 | Jones et al. |
| 2006/0294376 A1 | 12/2006 | Sands, IV et al. |
| 2007/0088659 A1 | 4/2007 | Phillips |
| 2007/0098004 A1 | 5/2007 | Lada |
| 2008/0065782 A1 | 3/2008 | Jones |
| 2008/0137883 A1 | 6/2008 | Araki |
| 2008/0168185 A1 | 7/2008 | Robbin et al. |
| 2008/0168526 A1 | 7/2008 | Robbin et al. |

OTHER PUBLICATIONS

"iPodder—The Cross-Platform Podcast Receiver", XP-002409911, http://ipodder.sourceforge.net/, Version 2.0.5, May 19, 2005, 3 pages.

* cited by examiner

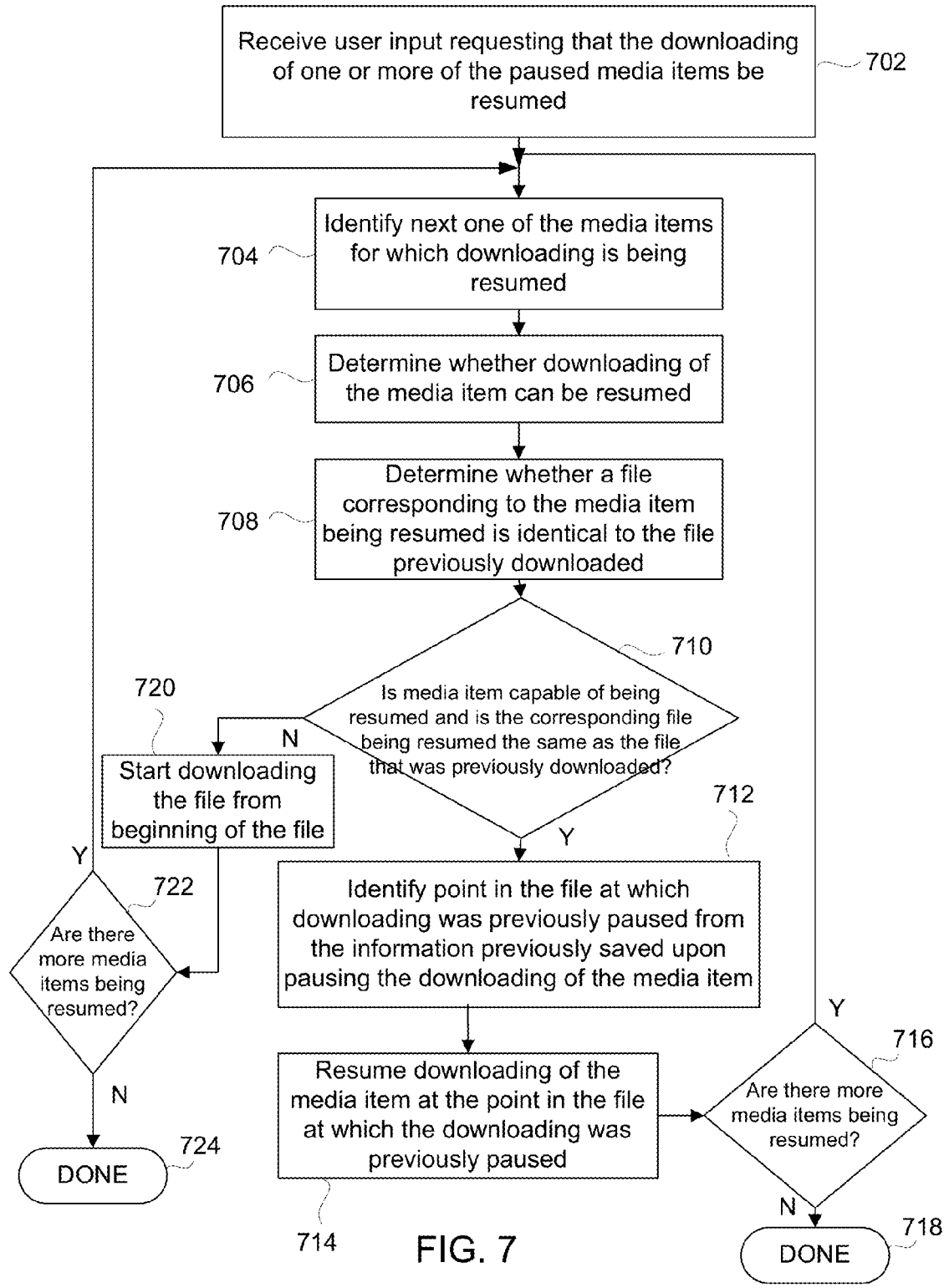

MANAGEMENT AND PRIORITIZATION OF MEDIA ITEM DOWNLOADING

CROSS-REFERENCE TO RELATED APPLICATIONS

This application is a continuation of U.S. patent application Ser. No. 13/048,621, filed Mar. 15, 2011 and entitled "MANAGEMENT OF PRIORITIZATION OF MEDIA ITEM DOWNLOADING," which is hereby incorporated herein by reference, which is in turn a divisional application of U.S. patent application Ser. No. 12/723,616, filed Mar. 12, 2010 and entitled "MANAGEMENT OF PRIORITIZATION OF MEDIA ITEM DOWNLOADING," which is hereby incorporated herein by reference, which in turn is a continuation of U.S. patent application Ser. No. 11/519,980, filed Sep. 11, 2006 and entitled "MANAGEMENT OF PRIORITIZATION OF MEDIA ITEM DOWNLOADING," which is hereby incorporated herein by reference.

BACKGROUND OF THE INVENTION

1. Field of the Invention

The present invention relates to management of media asset downloading, and more particularly, to media asset downloading in a client-server environment.

2. Description of the Related Art

Traditionally, music has been purchased at music stores or music departments of larger stores. A consumer will visit the music store or department and manually browse for albums or compact discs (CDs) of interest. Often, the music in the music store or department is categorized by genre, and then indexed by artist. For example, genre can include rock, country, pop, soul, jazz, etc. After the consumer selects an album or CD of interest, the consumer proceeds to a check-out register to pay for the album or CD being purchased.

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming. Normally, client-side programs assist a user with interaction via the Internet with a server computer that stores available media files. In this way, a user of a client-side program is able to browse, preview, purchase and/or download available media files over the Internet. These operations can be referred to as media operations.

Given that media operations are bandwidth-intensive, the user can experience delays if earlier media operations are slow to complete. For example, the download of a media file to a client can take at least several minutes, and during this period, the user may want to perform another media action (e.g., browse). However, the subsequent media operation must await the completion of the download operation. Delays of this sort are bothersome to users and tend to reduce user satisfaction.

Thus, there is a need for media operations such as downloading to be processed in a manner that enhances user satisfaction.

SUMMARY

The disclosed embodiments relate generally to the downloading of media items. The media items may include, for example, audio, video, image, or podcast data. In accordance with one embodiment, two or more media items may be downloaded concurrently. In accordance with another embodiment, a user may control the downloading of each of the media items, as desired.

In accordance with one embodiment, the media items being downloaded are identified in a list of media items. More particularly, each entry in the list of media items may identify a media item, as well as its corresponding download status (e.g., eligible to download, downloading). A download priority indicating an order in which the corresponding media item is to be downloaded may be identified explicitly or implicitly (e.g., via its placement in the list).

In accordance with another embodiment, two or more media items may be concurrently downloaded. A list of two or more media items is identified or obtained. A priority of the two or more media items is ascertained. Two or more media items in the list of media items are concurrently downloaded according to the ascertained priority. As a media item completes downloading, the downloading of a next prioritized media item may be automatically initiated.

In accordance with yet another embodiment, the list of media items is maintained internally. In addition, the list of media items may be viewed by a user via a graphical user interface. The graphical user interface can be presented to the user at a client (client machine). In one embodiment, the graphical user interface is presented to the user by an application program that runs on the client.

In accordance with yet another embodiment, a user may control the downloading of each item in the list of media items. More particularly, the user may choose to download, pause, or resume downloading one or more media items identified in the list of media items. In other words, the user may alter the download status of any of the items in the list of media items. In addition, the user may re-prioritize the order in which the media items in the list or a subset thereof are to be downloaded.

In accordance with yet another embodiment, a method for concurrently downloading media items can, for example, include the operations of: obtaining or identifying a list of media items, the list of media items including two or more media items; ascertaining a priority of the two or more media items; concurrently downloading two or more media items in the list of media items according to the ascertained priority; pausing the downloading of at least one of the two or more media items being downloaded, the pausing being at a pause position of the at least one of the two or media items being paused; and resuming the downloading of the at least one previously paused media item from the pause position.

In accordance with yet another embodiment, a non-transitory computer readable medium including at least computer program code for concurrently downloading media items. The computer readable medium can, for example, include at least: computer program code for obtaining or identifying a list of media items, the list of media items including two or more media items; computer program code for ascertaining a priority of the two or more media items; computer program code for concurrently downloading two or more media items in the list of media items according to the ascertained priority; computer program code for pausing the downloading of at least one of the two or more media items being downloaded, the pausing being at a pause position of the at least one of the two or media items being paused; and computer program code for resuming the downloading of the at least one previously paused media item from the pause position.

In accordance with yet another embodiment, an apparatus adapted for concurrently downloading media items can, for example, include at least: a display, a processor, and a memory. The apparatus can be configured to: (i) obtain or identify a list of media items to be downloaded to a recipient computing device, the list of media items including two or more media items; (ii) ascertain a priority of the two or more media items; and (iii) concurrently download two or more media items in the list of media items according to the ascertained priority.

The invention can be implemented in numerous ways, including as a method, system, device, apparatus, graphical user interface, or computer readable medium. Several embodiments of the invention are discussed below.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 7 is a process flow diagram illustrating a method of resuming the downloading of a media asset that was previously paused in accordance with one embodiment of the invention.

DETAILED DESCRIPTION OF EMBODIMENTS OF THE INVENTION

The present invention relates to management and prioritization of media asset (i.e., media item) downloading. More particularly, the disclosed embodiments relate to media asset downloading in a client-server environment. A media asset can, for example, be a podcast episode, television episode, audio, video, or image data.

Embodiments of various aspects of the invention are discussed below with reference to FIGS. 1-7. However, those skilled in the art will readily appreciate that the detailed description given herein with respect to these figures is for explanatory purposes as the invention extends beyond these limited embodiments.

One aspect of the invention pertains to a system and method for downloading media items over a network. Those media items that are downloaded may include, for example, media items that are purchased from an online media store. In order to purchase a media item from the online media store, a potential purchaser can search and browse through numerous media items that are available for purchase. Upon purchasing a media item, the media item is included in a list of items to be downloaded. Each of the media items in the list is typically downloaded one at a time. The order in which the media items are downloaded may be the order in which the purchaser purchased the media items. However, the order in which the media items are downloaded need not be the same as the order in which the purchaser purchased the media items. Unfortunately, the purchaser cannot control the downloading of the media items individually. For example, upon canceling the downloading, the downloading of all of the media items in the list is cancelled. The disclosed embodiments enable a user to actively manage and control the downloading of media items in a media list.

The content for each media item in the list of media items can be downloaded over the network to the purchaser. The content for the media item may then be encrypted for the purchaser's use and stored on the purchaser's machine. Thereafter, the purchaser can make use of the media item (e.g., play the media item). However, the use of the media item can still be limited. For example, only up to a predetermined number user machines can be authorized to use the media item, or only up to a predetermined number of compact disc copies can be made of a grouping or collection of media items (e.g., a playlist).

Figure 1:
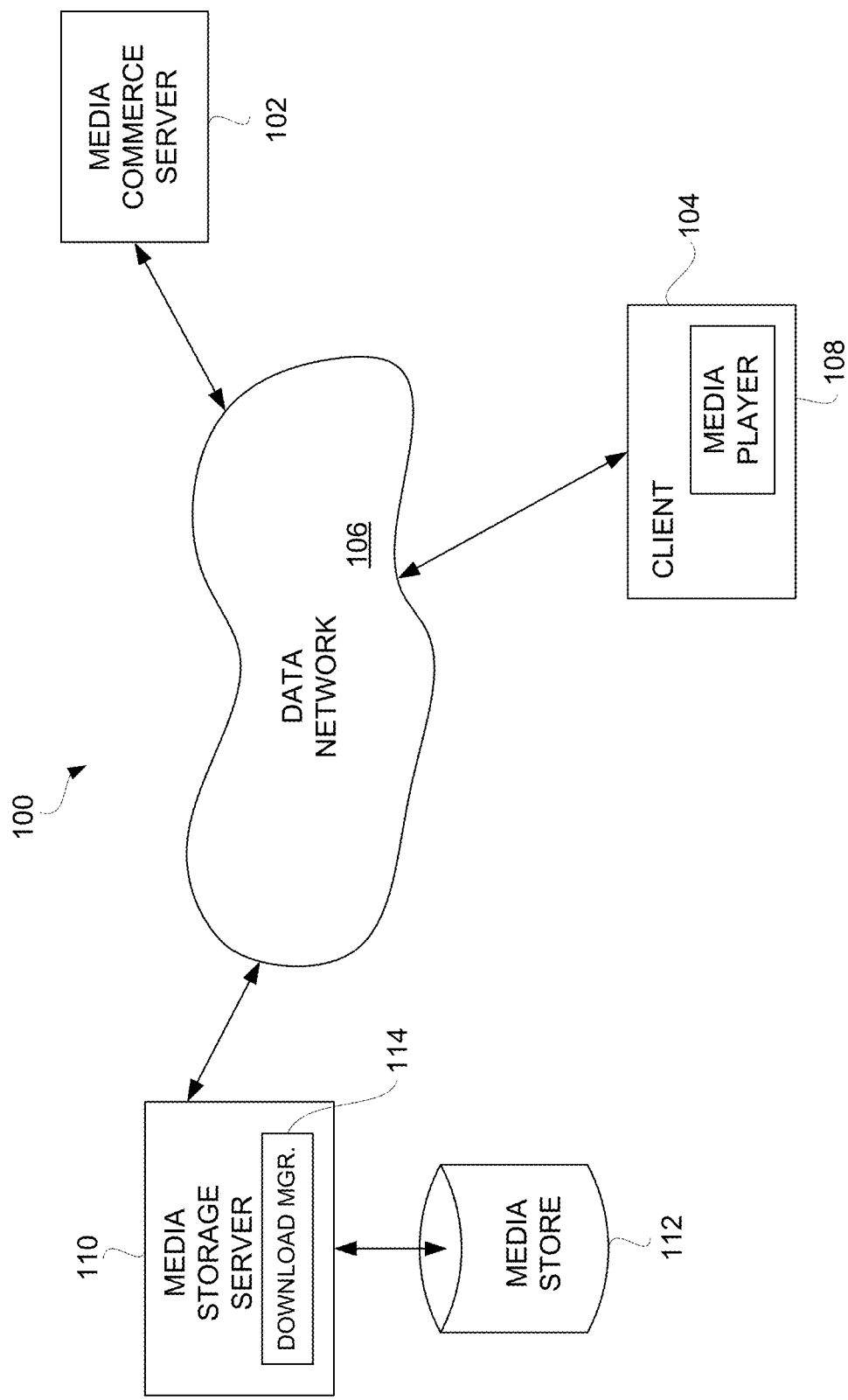
FIG. 1 is a block diagram of a media purchase system according to one embodiment of the invention.

FIG. 1 is a block diagram of a media purchase system 100 according to one embodiment of the invention. The media purchase system 100 includes a media commerce server 102. The media commerce server 102 coordinates review and/or purchase of media items through on-line transactions. On-line transactions to purchase media items is also referred to as electronic commerce (e-commerce). The media purchase system 100 also includes a client 104. Typically, the media purchase system 100 would include a plurality of different clients 104. Each client 104 includes a media player 108. The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media items. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media storage server 110 and a media store 112. The media storage server 110 represents a remote storage server that couples to the data network 106. The media store 112 provides mass storage of the numerous media items that are available for purchase via the media purchase system 100. Once purchased, the media items can be accessed from the media store 112 over the data network 106 by way of the media storage server 110.

More particularly, the media purchase system 100 allows a user of the client 104 to utilize the media player 108 to browse, search or sort through a plurality of media items that can be purchased from the media commerce server 102. The media player 108 may also allow the user to preview a media clip of the media items. In the event that the user of the media player 108 desires to purchase a particular media item, the user (via the media player 108) and the media commerce server 102 engage in an on-line commerce transaction in which the user pays for access rights to the particular media item. In one embodiment, a credit card associated with the user is credited for the purchase amount of the particular media item.

In the media purchase system 100 shown in FIG. 1, the media items are stored in the media store 112 and retrieved via a download manager 114 of the media storage server 110. Hence, the media commerce server 102 need not burden its resources to deliver any of the media items that may be purchased to the client 104. Instead, on purchasing a particular media item, the download manager 114 adds the media item to a list of media items to be downloaded. In addition to purchased media items, other media items such as podcast episodes that have been subscribed to may be automatically added to the list of media items. Similarly, non-purchased media items such as podcast episodes can be added to the list of media items via the client 104. The download manager 114 can then download the media items in the list of media items. In accordance with one embodiment, the download manager concurrently downloads two or more media items. In this regard, the download manager 114 obtains the media content corresponding to the particular media item from the media store 112 and downloads such content through the data network 106 to the client 104. The downloaded media content can then be stored on the client 104. In one embodiment, the downloaded media content is stored on the client 104 as received. In another embodiment, the downloaded media content is transcrypted from one encryption key to another encryption key before persistent storage on the client 104. In still another embodiment, the downloaded media content is encrypted as received at the client 104 but is decrypted and then re-encrypted before persistent storage on the client 104. Thereafter, the media player 108 can present (e.g., play) the media content at the client 104.

In accordance with one embodiment, the download manager 114 achieves concurrent downloading by establishing a different HTTP connection for each media item being downloaded. More particularly, the download manager 114 generates a different HTTP request for each download operation. The download manager 114 may manage a pre-determined maximum number of concurrent download operations. While the download manager 114 may ascertain a relevant connection speed, the download manager 114 need not obtain such additional data.

The connections through the data network 106 between the media commerce server 102, the client 104 and the media storage server 110 can be through secure connections, such as Secure Sockets Layer (SSL). Further, the media content may be stored at the client 104 in an encrypted manner.

As discussed in greater detail below, in accordance with one embodiment, a window that displays a list of media items being managed by the download manager 114 may be presented on a display device of the client 104. In one embodiment, the window is presented to the user by an application program that runs on the client.

In accordance with one embodiment, the user may choose to access the list of media items to be downloaded. For instance, from the online media store, the user may ascertain whether the list contains items to be downloaded. Moreover, the user may also easily ascertain the number of items in the list. As one example, the online media store may indicate via a graphical user interface that there are three items in the list of media items to be downloaded. Such a graphical user interface may be presented, for example when the list includes one or more items.

Figure 2:
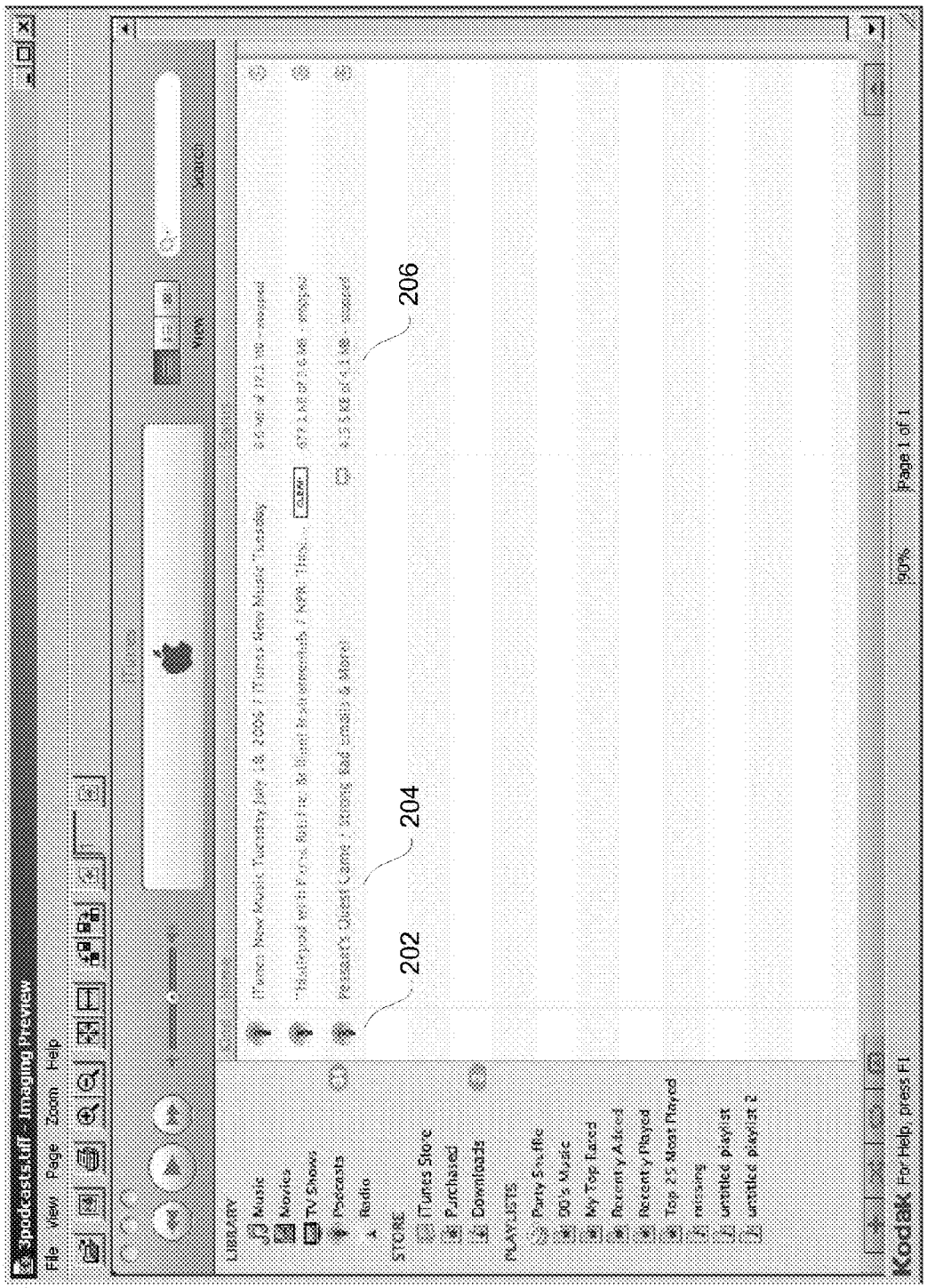
FIG. 2 is a screen shot of a representative application program window that displays a list of media items for use in concurrent downloading in accordance with one embodiment of the invention.

FIG. 2 is a screen shot of a representative application program window that displays a list of media items to be downloaded in accordance with one embodiment of the invention. In this example, the list of media items to be downloaded includes three media items. Each media item in the list of media items may include a variety of information. For instance, as shown in FIG. 2, a kind column 202 including the kind (i.e., type) of media item is provided. For instance, the type of media item may be an online store purchase or a podcast. Moreover, the type of media item may indicate whether the media item is audio or video, music, television episode, etc. The type of media item may be indicated by an icon or other visual display. In this example, an icon indicates that each of the three items in the list of media items are podcast episodes. Each media item may be identified by name in a name column 204, as shown. In addition, a download status associated with each media item may be provided in a status column 206. For instance, the download status may indicate that the media item is eligible (i.e., waiting) to be downloaded, that the media item is being downloaded, that the downloading of the media item has been paused, or that an error has occurred. In this example, the download status of each of the media items is "stopped" (i.e., paused). A media item that has completed downloading is no longer presented in the list of media items. In other embodiments, a media item that has completed downloading may have a completed status.

As downloading of media items in the list of media items completes, those media items that have completed downloading may be automatically removed from the list. A media item may be added to the list of media items automatically in accordance with a variety of rules or settings. For instance, when a user has subscribed to a particular podcast, an episode of the podcast may be automatically added to the list of media items. A user may also choose to add a media item to the list of media items, such as by purchasing a media item from an online media store or by clicking a download button.

The user may choose to change the order in which the media items in the list (or a subset thereof) are downloaded. In this example, the media items are downloaded in the order in which they are listed in a top-down order. Therefore, the user may re-prioritize the media items by performing a drag-and-drop operation to move the media items within the list. In this manner, the user may change the order in which the media items in the list are downloaded. For instance, the order in which the media items are placed in a corresponding queue may be modified accordingly. As one example, the information corresponding to each media item may be stored as an element in a linked list. Therefore, modifying the order of the media items in the linked list may be performed by modifying the appropriate pointers.

It may also be desirable to change the download status of one or more of the media items in the list. For instance, the user may choose to start the downloading of media items that are eligible to be downloaded (e.g., those that have not yet been downloaded or that have been paused during downloading), or pause the downloading of any of the media items in the list. Any of these operations may be performed via a user-interface such as a button or drop-down menu.

Figure 3:
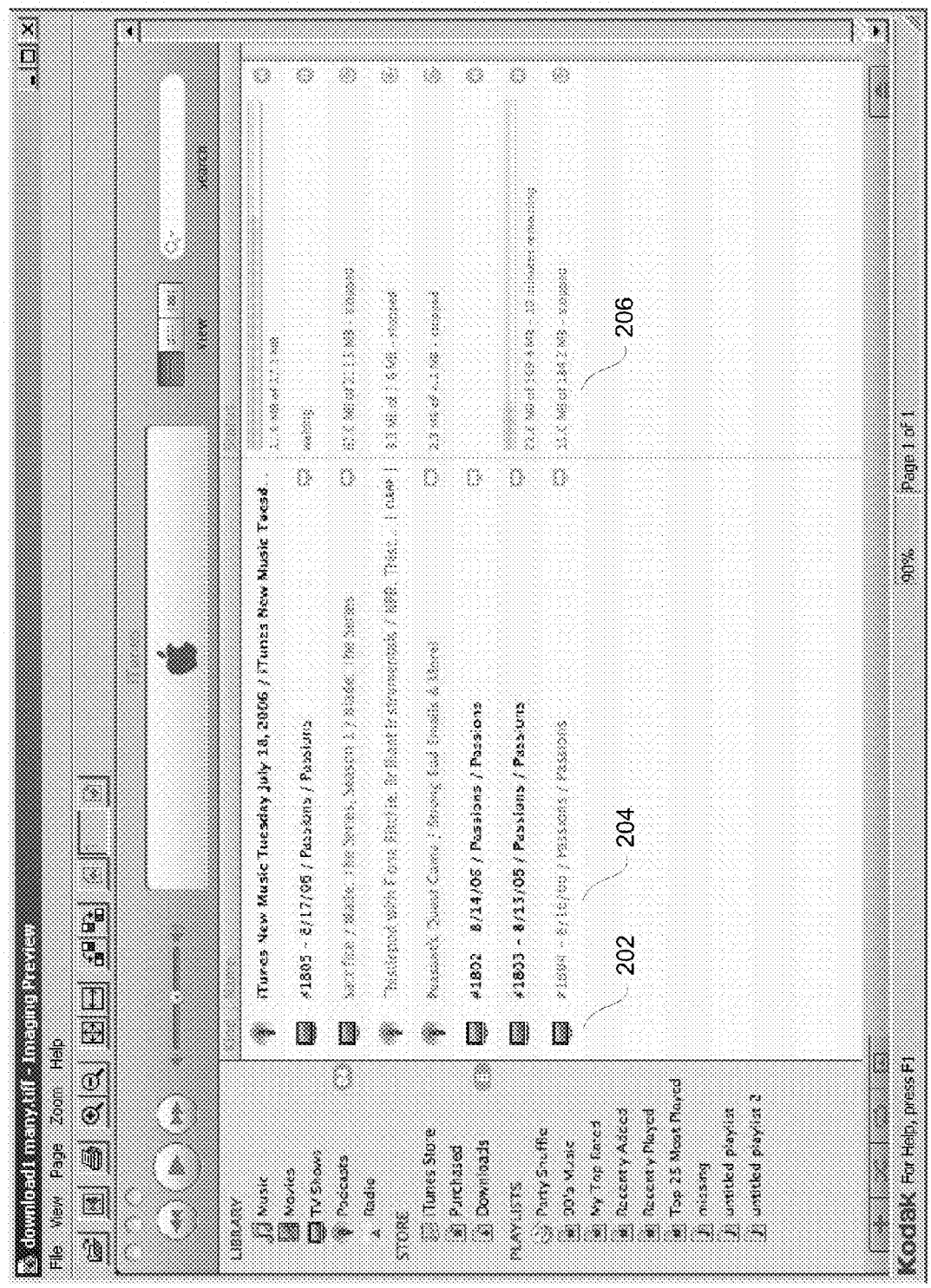
FIG. 3 is a screen shot of a representative application program window that illustrates the capability of the user to control the concurrent downloading process in accordance with one embodiment of the invention.

FIG. 3 is a screen shot of a representative application program window that illustrates the capability of the user to control the concurrent downloading process in accordance with one embodiment of the invention. As shown in the "Kind" column, an icon or other indicator may indicate that the media item is a podcast episode or online media store purchase. In this example, five online store purchases have been added to the list of media items shown in FIG. 2. In addition, the user has changed the order in which the media items are to be downloaded, as shown. More particularly, although the online media store purchases have been added to the list after the podcast episodes, two of the online store purchases have been placed in the second and third entries in the list of media items. The user has also chosen to resume the downloading of two of the three podcast episodes.

As shown in this example, information may be displayed indicating the amount of the media item (e.g., file) that has been downloaded, an amount of the media item that remains to be downloaded, and/or a time remaining to complete the downloading of the corresponding media item. Such information may be provided for each media item in the list of media items, or alternatively, such information may be provided only for those media items that are in the process of being downloaded, for which downloading has been paused and/or for which downloading has been resumed.

Figure 4:
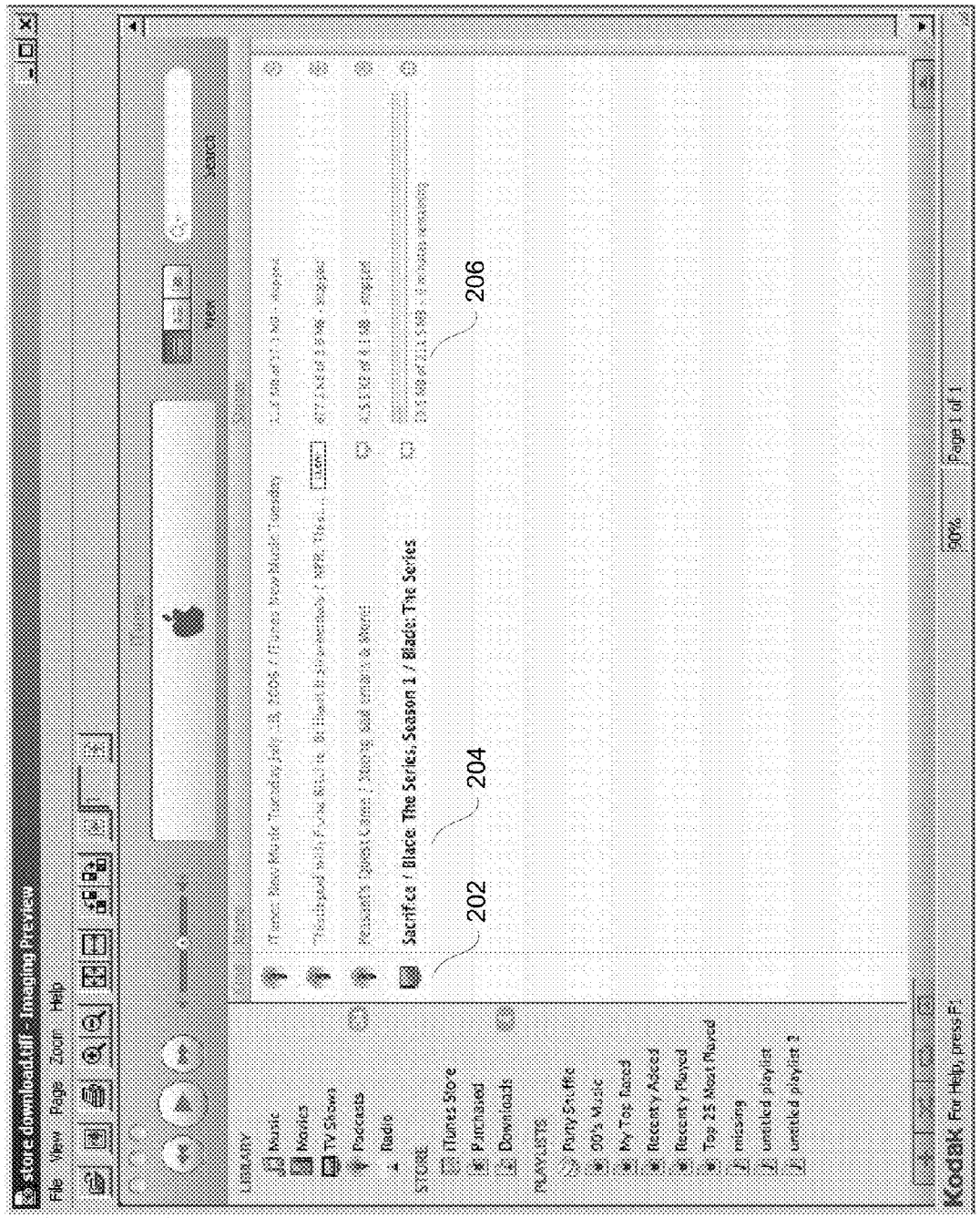
FIG. 4 is a screen shot of a representative application program window that illustrates the list of media items upon completing a purchase of a media item from an online media store in accordance with one embodiment of the invention.

FIG. 4 is a screen shot of a representative application program window that illustrates the list of media items upon completing a purchase of a media item from an online media store in accordance with one embodiment of the invention. As described above with reference to FIG. 2, the list included three podcast episodes. Upon purchasing a media item from the online media store, the media item is added to the list of media items. In this example, the new media item that has been purchased is added as the fourth item in the list. Although in this example, the maximum number of media items that can be concurrently downloaded is three, since the first three items have been paused, the fourth item is downloaded.

In accordance with one embodiment, even if a media item is dragged to re-prioritize the media item, it will not be re-prioritized if it has already started downloading. However, once the downloading of the media item has been paused, the media item will be re-prioritized.

Figure 5:
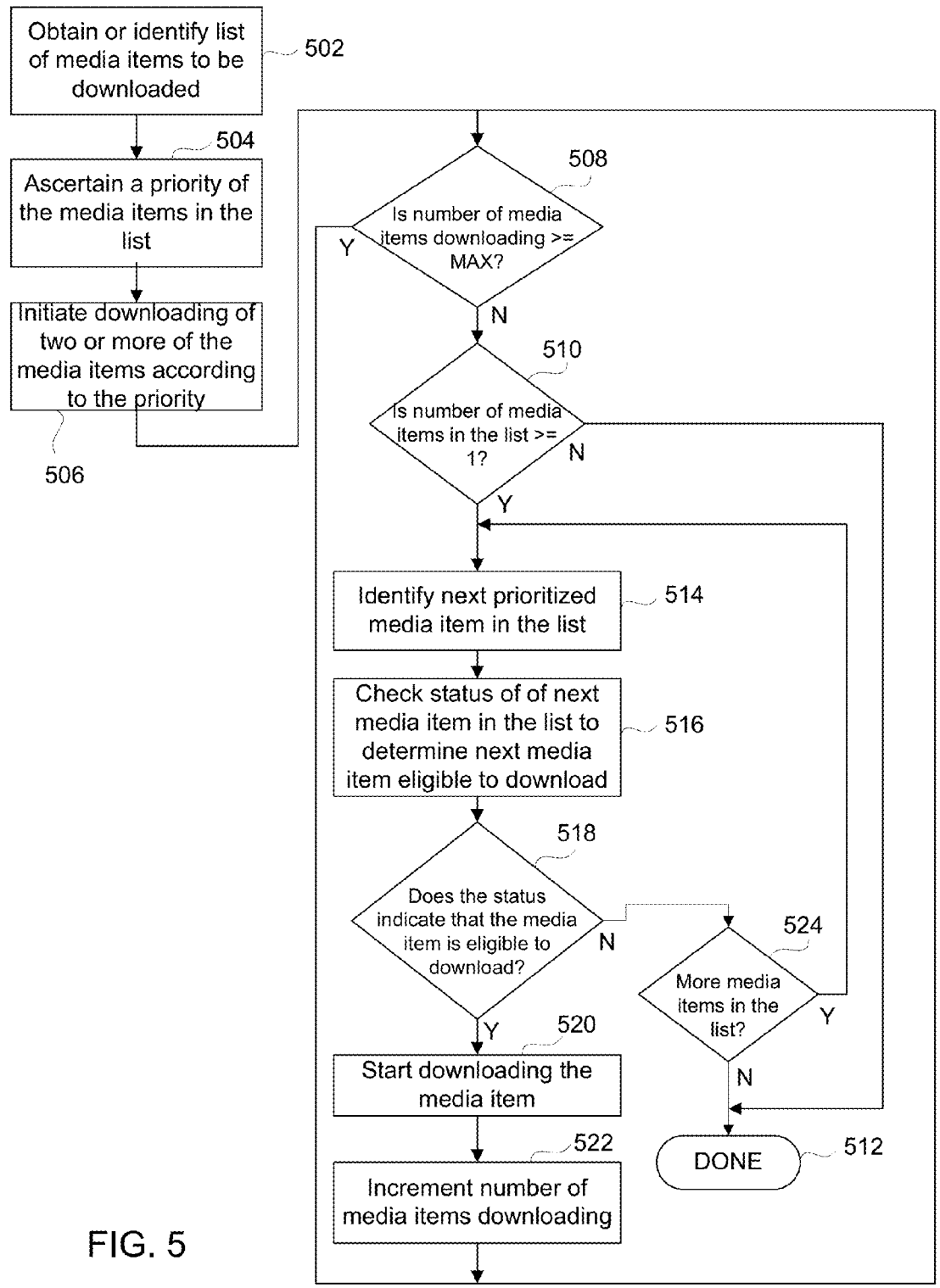
FIG. 5 is a process flow diagram illustrating a method of performing concurrent downloading of media assets in accordance with one embodiment of the invention.

FIG. 5 is a process flow diagram illustrating a method of performing concurrent downloading of media assets in accordance with one embodiment of the invention. A list of media items to be downloaded is obtained or identified at 502. Assuming that the list includes two or more media items, a priority of the media items is ascertained at 504. For instance, the priority may easily be ascertained from a list that is read in top-down order. Two or more of the media items in the list are concurrently downloaded according to the ascertained priority at 506. The media items that are selected to be downloaded are those that are eligible to be downloaded (e.g., not already being downloaded, paused, or having an error status). Concurrent downloading may be achieved by generating a separate HTTP request for each media item to be downloaded.

As the downloading of one or more of the media items completes, the downloading of one or more additional media items may be initiated in accordance with the ascertained priority. Thus, the completion of the downloading of one or more media items may initiate further processing by the download manager. For instance, the download manager may ascertain the number of media items that are being concurrently downloaded. This may be accomplished, for example, by maintaining a counter reflecting the number of items being downloaded, which may be incremented as new items are downloaded, and decremented as the downloading of a media item completes.

If the number of media items being downloaded is not greater than or equal to a pre-determined maximum number of media items at 508, the download manager may initiate the downloading of one or more additional media items. However, this also depends on the number of media items that remain in the list of media items. If no items remain in the list at 510, the process ends at 512.

Assuming that one or more media items remain in the list and the number of media items being downloaded is less than the maximum number of items that can be downloaded, the next prioritized media item in the list is identified at 514. It is then determined whether the next prioritized media item is eligible to be downloaded at 516. This may be accomplished by checking the download status of the media item. For instance, if the media item is already being actively downloaded or has been paused, the media item is not eligible to be downloaded. As another example, an error may have occurred during a previous attempt to download the media item, resulting in an error status. If the status indicates that the item is eligible to be downloaded at 518, downloading of the media item is initiated at 520. As set forth above, an HTTP request may be transmitted to initiate the downloading of the media item from the server. The number of media items that are downloading may be incremented at 522. The process continues at 508, as described above.

If a prioritized media item is not eligible to be downloaded at 518, the item is not downloaded. If more media items remain in the list as shown at 524, the process continues at 514 for the next prioritized media item. Downloading for the next prioritized media item may be initiated if its download status indicates that the media item is eligible to be downloaded, as described above.

Figure 6:
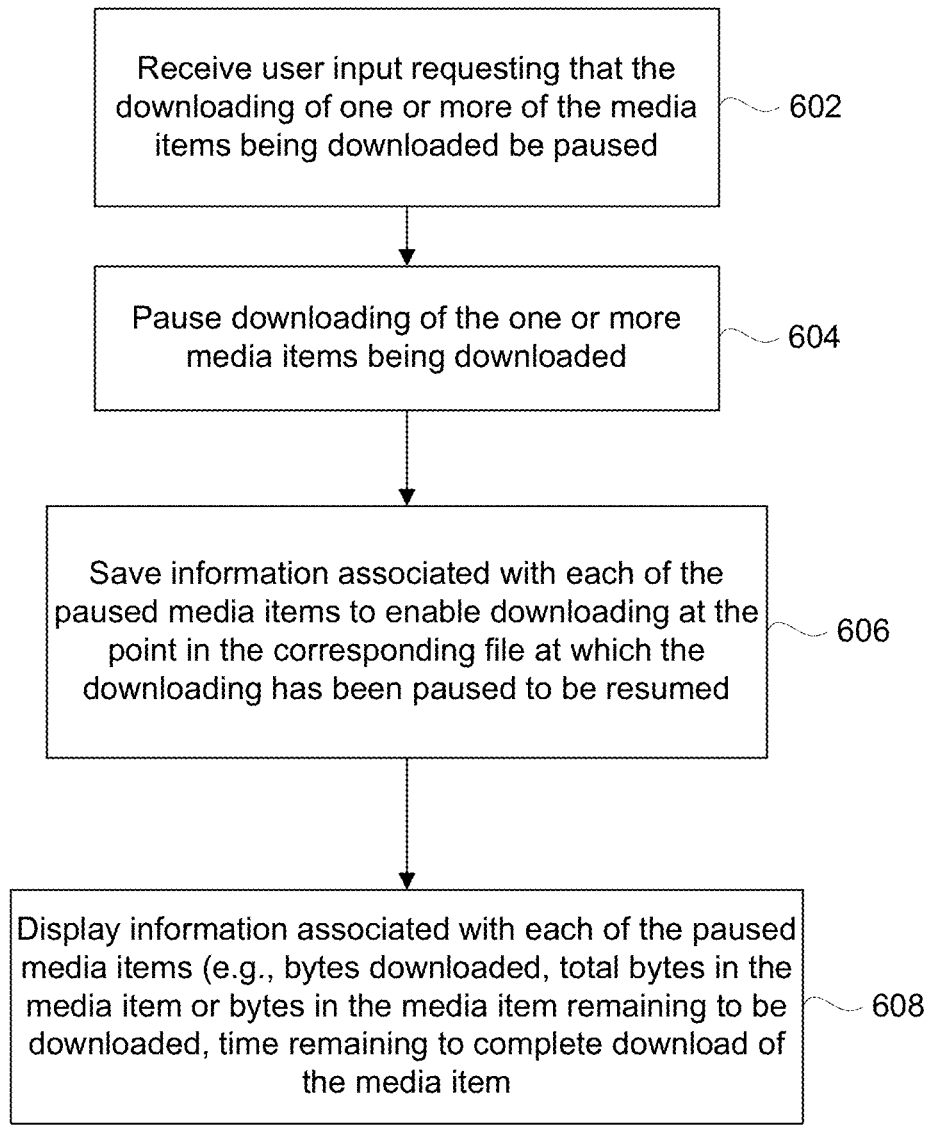
FIG. 6 is a process flow diagram illustrating a method of pausing the downloading of media assets in accordance with one embodiment of the invention.

Once downloading of a media item has been initiated, the user may choose to pause the downloading. FIG. 6 is a process flow diagram illustrating a method of pausing the downloading of media assets in accordance with one embodiment of the invention. A user may choose to pause the downloading of one or more of the media items being downloaded. User input is received requesting that the downloading of one or more of the media items be paused at 602. For instance, the user may choose to pause the downloading of a selected media item by clicking on a button associated therewith. Alternatively, the user may choose to pause the downloading of one or more media items via a drop-down menu, graphical user interface, or other suitable mechanism.

Upon receiving input from the user, the downloading of the one or more media items identified by the user is paused at 604. Information associated with each of the paused media items is then stored to enable downloading at the point in the corresponding file at which the downloading has been paused to be resumed at a later time at 606. More particularly, the information indicates a point in a file corresponding to each of the paused media items at which downloading was paused. For instance, the information may indicate the amount (e.g., number of bytes) of the file that has been downloaded. If the media item was an online media store purchase, the information may also include any relevant store information such as the name of the media item, a unique identifier identifying the media item, and/or a corresponding user account that the media item came from. The information may also include information from corresponding HTTP headers such as an etag, date modified, and/or MD5 checksum, which may be used to resume downloading and/or determine whether it is possible to resume downloading.

As shown at 608, information associated with a paused media item may be displayed. This information may indicate the amount of the media item (e.g., file) that has been downloaded, an amount of the media item that remains to be downloaded, and/or a time remaining to complete the downloading of the corresponding media item.

Once the downloading of a media item has been paused, the downloading may be resumed. FIG. 7 is a process flow diagram illustrating a method of resuming the downloading of a media asset that was previously paused in accordance with one embodiment of the invention. As shown at 702, user input requesting that the downloading of one or more of the previously paused media items be resumed is received. The next one of the media items for which downloading is being resumed is identified at 704. For instance, the next prioritized media item that the user has requested be resumed may be identified.

In accordance with one embodiment, it is determined whether the downloading of the media item is capable of being resumed at 706. More particularly, in some embodiments, it is not possible to resume downloading certain types of media items for which downloading has been paused. For instance, it may be possible to pause the downloading for a video or podcast file and resume at the point at which the downloading was previously paused. However, it may be impossible to pause the downloading of a song and resume at the point at which the downloading was previously paused. As a result, the online media store may provide additional information enabling a determination to be made as to whether the downloading can be resumed at the point at which the downloading was previously paused.

In accordance with one embodiment, an MD5 hashing function is used to determine whether the resulting value matches the MD5 checksum value that was previously saved when the downloading was paused. If the values are the same, then the downloading of the file can be resumed. However, if the values are not the same, the downloading of the file cannot be resumed.

It is also possible that the media item for which downloading being resumed has been modified since downloading was initiated. As a result, it may be desirable to determine whether a file corresponding to the previously paused media item for which it is requested that downloading be resumed is identical to the file previously downloaded at 708. For instance, the URL of the file, the number of bytes in the file, the last modified date and/or etag (if present) may be used to determine if the file has changed since the downloading was previously initiated.

If the media item is capable of being resumed and the corresponding file is the same (e.g., it has not been modified) at 710, a point in the file at which downloading was previously paused is identified from the information that was previously saved when the downloading was previously paused at 712. The downloading of the previously paused media item is resumed at 714. More particularly, the downloading is resumed at the point in the file corresponding to the previously paused media item at which downloading was previously paused. The process continues at 716 for all remaining media items for which downloading is being resumed until the process ends at 718.

If the media item is not capable of being resumed and/or the corresponding file is not the same (e.g., the file has been modified) at 710, the downloading is initiated at the beginning of the file at 720. Of course, if the file is no longer available, an error status may be associated with the media item. The process continues at 722 for all remaining media items for which downloading is being resumed until the process ends at 724.

In accordance with one embodiment, if the user chooses to exit the system (e.g., the online media store) before all of the media items in the list of media items are downloaded, the list of media items may be saved to a file or other suitable data structure. For instance, when the user exits or logs out of the online media store, the list of media items may be saved. Upon re-entry to the system (e.g., online media store), the list of media items may be populated from the file or data structure. For each item in the list that was previously purchased from the online media store, it may be determined whether the item is currently available from the online media store. For instance, the user may be prompted to check if each item is still available from the online media store. If the user selects this option, the system automatically checks if the item is still available from the online media store. If the item is no longer available from the online media store, the content can no longer be downloaded and the item is deleted from the list. However, if the item is still available from the online media store, the item remains in the list.

If the user chooses not to select the checking option, the system may attempt to download a file that is no longer available in the online media store. As a result, the download status of that media item may be changed to "error."

The various aspects, features, embodiments or implementations of the invention described above can be used alone or in various combinations. The media items can pertain to podcast episodes, audio items (e.g., audio files or songs, such as for music or audiobooks), video items (e.g., video files, television episodes or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that media items are able to be concurrently downloaded to a user's machine. Another advantage of the invention is that the downloading of media items can be controlled by a user. For instance, the user may modify the order in which the media items are downloaded. As another example, the user may modify the download status of one or more media items. For instance, the user may initiate the downloading of one or more media items that are eligible for downloading, pause the downloading of one or more media items that are downloading, or resume the downloading of one or more media items for which downloading has previously been paused.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
  identifying a list of media items;
  ascertaining a priority of media items in the list of media items;
  downloading, via a computing device over a network, media items in the list of media items according to the priority;
  pausing, via the computing device, the downloading of a media item being downloaded, the downloading of the media item being paused at a pause position in the media item corresponding to a current download point in the media item when a pause request was received; and resuming, via the computing device, the downloading of the media item from the pause position.

2. The method as recited in claim 1, wherein each of the media items is a podcast episode or an item purchased from an online media store, and wherein downloading media items comprises concurrently downloading at least two media items.

3. The method as recited in claim 1, wherein pausing the downloading comprises:

determining a size of a portion of the media item already downloaded when the pause request was received; and storing an indication of the pause position, the indication being based on the size of the portion of the media item.

4. The method as recited in claim 1, wherein the downloading includes generating a separate HTTP request for each of the media items being downloaded.

5. The method as recited in claim 1, wherein the resuming comprises:

determining whether the downloading of the at least one of the media items can resume based on a media item type associated with the at least one of the media items and a checksum value associated with the at least one of the media items; and resuming the downloading from the pause position when the media item type is capable of being resumed and the checksum value matches a previous checksum value associated with the at least one of the media items, wherein the pause position is determined based on a data size of a portion of the at least one of the media items that completed downloading prior to the pausing.

6. The method as recited in claim 1, further comprising:

re-prioritizing the media items in the list of media items in response to a user selection.

7. The method as recited in claim 1, wherein downloading media items comprises concurrently downloading at least two media items, and wherein a predetermined maximum number of media items are able to be concurrently downloaded.

8. The method as recited in claim 1, wherein the method comprises:

determining whether a next prioritized media item in the list of media items is eligible to be downloaded, wherein the next prioritized media item is downloaded if it is determined that it is eligible to be downloaded.

9. The method as recited in claim 8, wherein determining whether a next prioritized media item in the list of media items is eligible to be downloaded comprises:

ascertaining whether a status of the next prioritized media item in the list of media items indicates that the next prioritized media item is already being downloaded, that the next prioritized media item has been paused, or that an error has occurred.

10. The method as recited in claim 1, further comprising, after a download of one of the media items being downloaded has completed, initiating downloading of another one of the media items in the list of media items according to the ascertained priority.

11. The method as recited in claim 1, further comprising: saving the list of media items to a file or data structure upon exiting an online media store.

12. The method as recited in claim 11, further comprising: populating the list of media items from the file or the data structure upon re-entering the online media store.

13. The method as recited in claim 1, wherein each media item in the list of media items has a download status, the method further comprising:

providing the download status associated with each media item in the list of media items.

14. The method as recited in claim 1, further comprising:

displaying information indicating at least one of an amount of the media item that has been downloaded, an amount of the media item that remains to be downloaded, or a time remaining to complete downloading of the corresponding media item.

15. A non-transitory computer readable medium having stored therein instructions which, when executed by a processor, cause the processor to perform operations comprising:

obtaining a list of media items;

ascertaining a priority of media items in the list of media items;

downloading, via a computing device over a network, media items in the list of media items according to the ascertained priority;

pausing, via the computing device, the downloading of at least one of the media items being downloaded, the pausing being at a pause position corresponding to a current download position when a pause request was identified; and resuming, via the computing device, the downloading of the at least one previously paused media item from the pause position.

16. An apparatus:

a processor; and a computer-readable device having stored therein instructions which, when executed by the processor, cause the processor to perform operations comprising:

identifying a list of media items to be downloaded to a recipient computing device;

ascertaining a priority of media items in the list of media items; and downloading, via a computer network, media items in the list of media items according to the ascertained priority.

17. An apparatus as recited in claim 16, computer-readable device storing additional instructions which, when executed by the processor, result in an operation further comprising displaying status information pertaining to download of the media items.

18. An apparatus as recited in claim 16, wherein downloading comprises concurrently downloading at least two media items from the list of media items.

19. An apparatus as recited in claim 16, the computer-readable device storing additional instructions which, when executed by the processor, result in an operation further comprising pausing a download of at least one of the media items being download, wherein the at least one of the media items being downloaded is paused at a pause position corresponding to a current download position of the at least one of the media items being downloaded associated with a pause request.

20. An apparatus as recited in claim 19, the computer-readable device storing additional instructions which, when executed by the processor, result in an operation further comprising resuming the download of the at least of the media items paused from the pause position.

21. A system comprising:

a processor; and a computer-readable medium having stored therein instructions which, when executed by the processor, cause the processor to perform operations comprising:

identifying a list of media items to be downloaded to a recipient computing device;
downloading, to the recipient computing device over a network, media items in the list of media items;
pausing the downloading of at least one of the media items being downloaded, the at least one of the media items being paused at a pause position corresponding to a current download amount of the at least one of the media items when a pause request was received; and
resuming the downloading of the at least one of the media items from the pause position.

\* \* \* \* \*